United States Patent [19]

Johnson

[11] Patent Number: 4,788,521
[45] Date of Patent: Nov. 29, 1988

[54] TEMPERATURE COMPENSATION SYSTEM FOR PIEZORESISTIVE PRESSURE SENSOR

[75] Inventor: Russell L. Johnson, New Brighton, Minn.

[73] Assignee: Honeywell Inc., Minneapolis, Minn.

[21] Appl. No.: 183,337

[22] Filed: Apr. 7, 1988

Related U.S. Application Data

[63] Continuation of Ser. No. 786,387, Oct. 10, 1985, abandoned.

[51] Int. Cl.[4] ............................ G01L 1/22; H01C 7/06
[52] U.S. Cl. ........................................... 338/3; 338/5; 338/8; 338/9
[58] Field of Search ...................... 338/2, 3, 4, 5, 6, 7, 338/8, 9, 306, 308; 73/766

[56] References Cited

U.S. PATENT DOCUMENTS

| | | | |
|---|---|---|---|
| 3,665,756 | 5/1972 | Russel | 338/3 |
| 4,299,130 | 11/1981 | Koneval | 338/9 X |
| 4,375,056 | 2/1983 | Baxter et al. | 338/308 X |

Primary Examiner—E. A. Goldberg
Assistant Examiner—M. M. Lateef
Attorney, Agent, or Firm—W. T. Udseth

[57] ABSTRACT

A temperature compensation scheme for a piezoresistive pressure sensor utilizing resistors with carefully chosen temperature coefficients of resistivity to provide a totally passive network.

22 Claims, 2 Drawing Sheets

TEMPERATURE COMPENSATION SYSTEM FOR PIEZORESISTIVE PRESSURE SENSOR

This application is a continuation of application Ser. No. 786,387, filed Oct. 10, 1985, now abandoned.

The present application relates to semiconductor pressure sensors, and more particularly to a semiconductor pressure sensor having a totally passive system for compensating sensor output for changes in temperature.

BACKGROUND OF THE INVENTION

Stress or pressure sensors are commonly manufactured by providing one or more piezoresistive elements on or in a diaphram. When the diaphram is flexed, a stress is placed on those piezoresistive devices, causing a change in resistance thereof. The resistance of such an element, at any given time, will therefore provide an indication of the pressure on the sensor at that time.

A problem with such a system relates to the fact that the resistance of such a piezoresistive device, and the sensitivity to changes in the stress, both are dependent upon temperature. In order to compensate for such sensitivity to temperature, prior art systems have provided complicated electronic circuits, containing many active elements, in order either to adjust the input voltage to the sensor element or to compensate the output signal directly so that the output signals will be dependent upon stress or pressure only.

A system which used only passive elements, such as resistors, to provide such compensation would be desirable for several reasons. Such a system could be more simply, and more inexpensively, fabricated. Furthermore, such a compensation system could be more easily fabricated as part of a single monolithic integrated circuit containing both the compensation system and the sensor element. This helps to improve sensor accuracy by reducing errors due to thermal gradients within the sensor housing.

SUMMARY OF THE INVENTION

In the present invention a plurality of electrical resistors are used to provide temperature compensation to a stress or pressure sensor. At least some of the compensation resistors are constructed of a thin film material which is laser trimable for calibration of the individual integrated circuit. The resistance and temperature coefficient of resistivity (TCR) of each element in the sensor and the compensation circuit is carefully adjusted so that changes in the resistance and the sensitivity to pressure occurring in the sensor resistors, with changes in temperature, will be matched by changes in the resistance of the resistors in the compensation networks.

DETAILED DESCRIPTION OF THE PREFERRED EMBODIMENT

Figure 1:
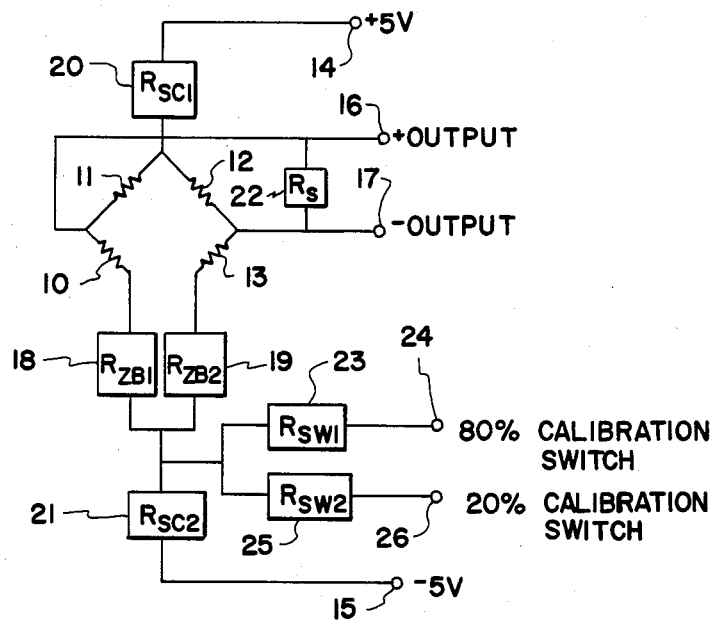
FIG. 1 is a block diagram of a preferred embodiment of the invention.

The present invention includes a network having one or more piezoresistive devices on a diaphram, typically of silicon. In the preferred embodiment, as shown in FIG. 1, four such piezoresistive devices are used in the form of a bridge. These four elements are shown in FIG. 1 as resistors 10, 11, 12, and 13. Preferrably resistors 10 and 12 are positioned radially to the diaphram and resistors 11 and 13 are provided tangential to the diaphram. In this way resistors 10 and 12 will increase in resistance with an increase in pressure while resistors 11 and 13 will decrease in resistance with an increase in pressure. In operation a first constant voltage, typically +5 volts, is applied to terminal 14, and a second constant input voltage, typically −5 volts is applied to terminal 15. This results in an output voltage related to the pressure on the diaphram appearing between output terminals 16 and 17.

The problem that arises is that if the voltages applied to terminals 14 and 15 remain constant and no other compensation is accomplished, the output voltage between terminal 16 and 17 will be a function of temperature as well as pressure. Prior art approaches have generally been to provide varying voltages to the input terminals of a pressure sensor in order to provide compensation for changes in temperature. In the present invention compensation is provided by a totally passive network, i.e. all resistors, to correct for changes in temperature. The compensation is accomplished by careful selection of the resistance and TCR of each piezoresistor and each resistor in the compensation network.

The compensation network must insure that the output with zero pressure may be calibrated to will be zero volts, and that there is no null shift with changes in temperature. This simply means that the output voltage will be zero volts when no pressure is applied to the sensor element regardless of the temperature. The compensation network must further insure that, for a selected maximum pressure, the desired full scale reading, typically 30 mvolts, will be obtained. Finally the compensation network must insure that the span, the difference between the maximum and minimum outputs, will remain constant over changes in temperature.

In the system of the invention the sensor elements 10, 11, 12, and 13 are provided with a large positive TCR. This means that as the temperature increases the resistance of each of sensor elements 10, 11, 12 and 13 will increase. In the preferred embodiment resistors exhibiting piezoresistance and a large positive TCR are provided by lightly doping the silicon substrate with a selected dopant.

Figure 2:
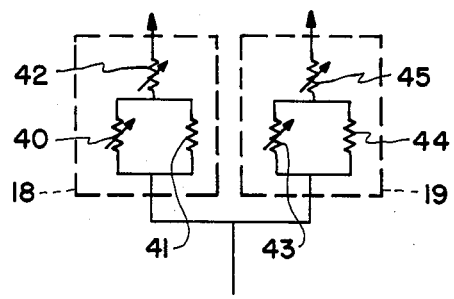
FIG. 2 is a schematic diagram of a null shift compensator which may be used with the invention.

Resistor networks 18 and 19 are used for balancing the bridge to a desired output level with zero pressure, typically zero volts, and eliminating null shift. FIG. 2 shows resistor networks used for zero balance in blocks 18 and 19 of FIG. 1. Blocks 18 and 19 include resistors 40, 41, and 42 and 43, 44, and 45, respectively. Resistors 40, 42, 43, and 45 are shown as variable resistors. This is intended to indicate that they are laser trimable, thin film resistors, although they are not variable resistors in the usual sense of the word. Resistor 42 and/or resistor 45 may be trimmed to alter their resistance and hence the bridge balance. Resistors 40, 42, 43, and 45 are thin film resistors with a very low TCR. Resistors 41 and 44 are ion implanted resistors, exhibiting a very high positive TCR.

If the sensor exhibits a null shift, resistor networks 18 and 19 may be further trimmed to eliminate such a null shift. If a positive null shift, i.e. the balance voltage increases with increasing temperature, resistor 43 should be trimmed in such a manner as to increase its resistance, by an amount determined by the amount of null shift exhibited. Resistor 42 is then trimmed in order to restore the desired balance voltage. If a negative null shift is exhibited a similar process is used in which resistors 40 and 45 are trimmed.

Figure 3:
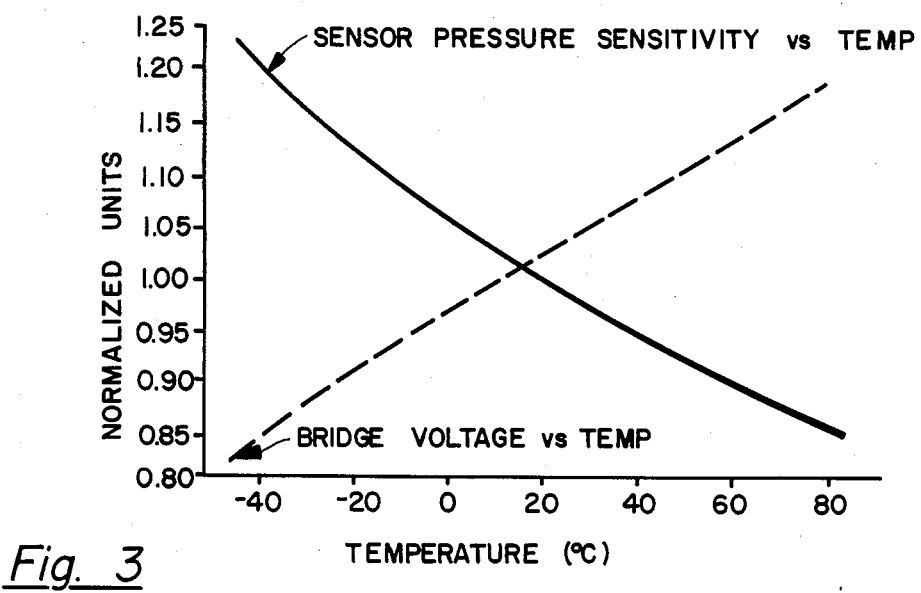
FIG. 3 is a graph showing bridge sensitivity and input voltage as functions of temperature.

Resistor networks 20 and 21 provide span or sensitivity compensation. The sensitivity of a piezoresistive pressure sensor will typically reduce with increasing temperature. Compensation for this may be obtained by increasing the voltage applied to the bridge. In the present invention this is accomplished by providing resistors having a very low TCR in networks 20 and 21. Networks 20 and 21 may each be a single low TCR resistor formed by ion implantation of a heavy dose of dopant into a semiconductor, or may be a single thin film resistor having a low TCR. A network using resistors of both types could also be used. FIG. 3 illustrates typical curves for the input voltage to the bridge and the bridge sensitivity as functions of temperature.

Resistor network 22 is used to adjust the maximum output voltage to a desired level which will remain constant over a range of temperatures. In order to avoid interaction with the span compensation networks the thermal characteristics of resistors in network 22 should be the same as those in sensor elements 10, 11, 12, and 13. Therefore, network 22 should include ion implanted and thin film resistors. In order to allow adjustment of the total resistance of network 22 a plurality of such resistors may be formed and connected to one another by thin film electrical conductors. These film conductors may be removed by laser trimming to adjust the resistance. If a small amount of interaction with the span compensation network is acceptable, a high TCR implanted resistor may be formed in series with a low TC thin film resistor. The thin film resistor may then be laser trimmed to adjust the resistance of resistance network 22.

Also shown in FIG. 1 are resistor networks 23 and 25 having terminals 24 and 26, respectively. Resistor networks 23 and 25 are used to provide an electronic test of the system. When output region 17 is electrically connected to input region 24 in the absence of any pressure on the diaphram will result in an output voltage between terminal 16 and 17 of some predetermined value, typically about 80% of the full scale output voltage. Alternatively, if terminal 17 is electrically connected to terminal 26 in the absence of pressre on the diaphram, a second predetermined voltage, typically 20% of the full scale value, will result between terminals 16 and 17. Resistor networks 23 and 25 would typically be formed in a manner similar to those of network 22. They should include a plurality of implanted resistors having a high TCR. These resistors should be connected to one another in a manner similar to that described for the implanted resistors of resistor network 22. As was the case with resistor network 22, the resistance of resistor networks 23 and 25 may be adjusted by using laser trimming of lengths between various resistors of resistor network 23 or 25 to remove those individual resistors from the network. As also was the case with regard to resistor network 22 resistor networks 23 and 25 could include a low TCR thin film resistor in electrical series relationship to the rest of the network, but doing so would cause some interaction with the span compensation circuitry. Such an arrangement would provide an easier adjustment of the resistance of resistor network 23 or 25 if such interaction with the span compensation is tolerable in a particular situation.

The foregoing discussion has referred to low TCR thin film resistors, low TCR implanted resistors, and high TCR implanted resistors. In the preferred embodiment the thin film resistors would have a TCR very near zero. Typically the nominal value would actually be approximately equal to zero with a tolerance of plus or minus one hundred parts per million per degree Celcius, although values as high as plus or minus five hundred parts per million per degree Celcius would be acceptable.

The temperature dependence of implanted resistors generally follows the equation below:

$$R_N = C_0 + C_1 T + C_2 T^2 + C_3 T^3 \quad (1)$$

where $R_N$ is the normalized resistance, T is the temperature in Fahrenheit, and $C_0$ through $C_3$ are constants determined by the doping level. For the heavily doped region discussed above, a dose of approximately $6.45 \times 10^{14}$ ions/cm$^2$ is used. This $10^{19}$ dopant atoms/cm$^3$ in the semiconductor material. This results in a resistivity of approximately 120 ohms per square. When such a resistor is prepared the constants of equation 1 become:

$$C_0 = 0.9831945 \times 10^0$$

$$C_1 = 0.7562640 \times 10^{-4}$$

$$C_2 = 0.199290 \times 10^{-5}$$

$$C_3 = -0.1932018 \times 10^{-8}$$

Figure 4:
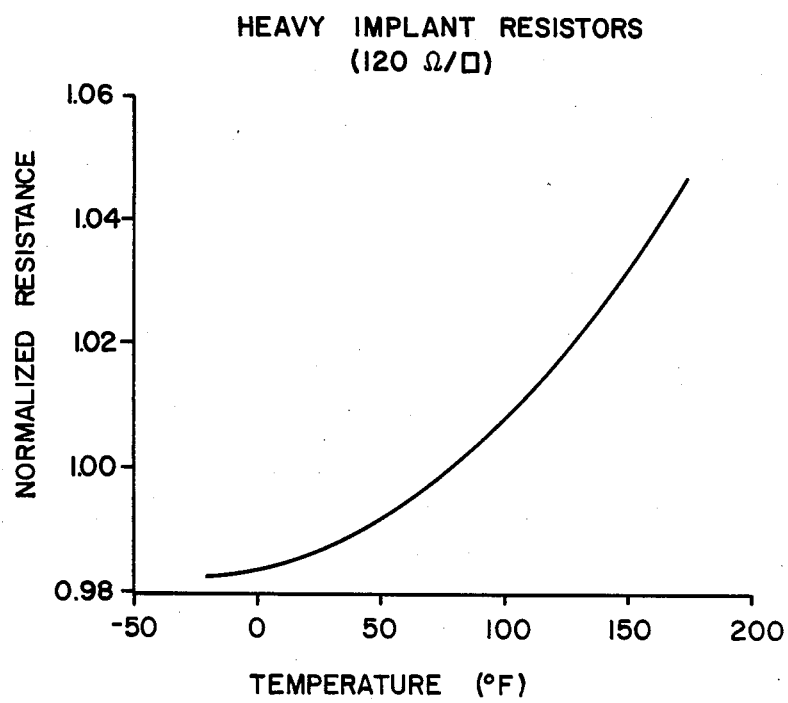
FIG. 4 is a graph showing the temperature dependence of a heavily, doped implanted resistor.

FIG. 4 is a graph of the normalized resistance of a resistor manufactured as shown above as a function of temperature.

In the preferred embodiment a dose of $4.5 \times 10^{13}$ ions/cm$^2$ is implanted into the semiconductor material to produce the lightly doped regions. The approximate peak concentration of dopant atoms resulting from such an implant is $1.7 \times 10^{18}$ dopant atoms/cm$^3$. The resulting resistor will have a resistivity of approximately 860 ohms per square. The constants for use in equation 1 are as follows:

$$C_0 = 0.9013656 \times 10^0$$

$$C_1 = 0.10311831 \times 10^{-2}$$

$$C_2 = 0.41400858 \times 10^{-5}$$

$$C_3 = -0.7355525 \times 10^{-8}$$

Figure 5:
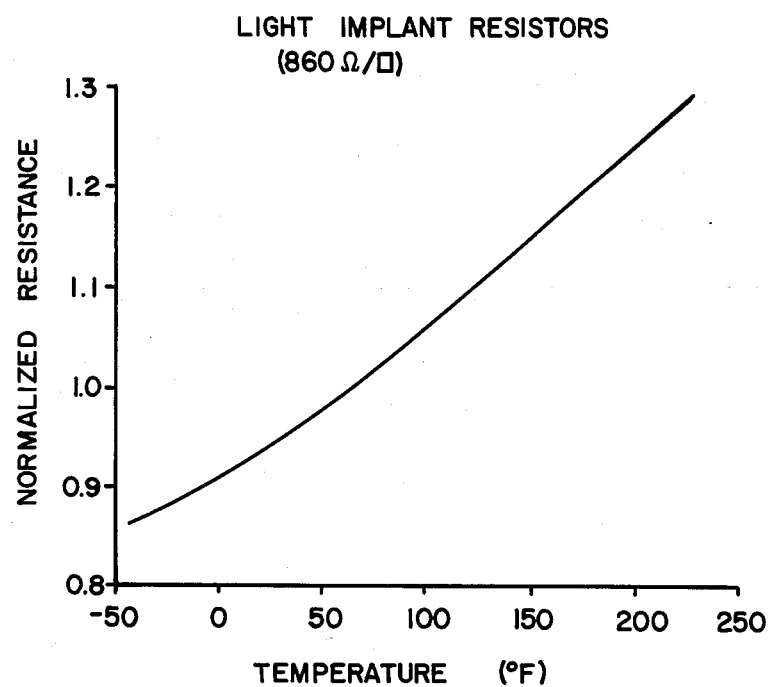
FIG. 5 is a graph showing the temperature dependence of a lightly doped implanted resistor.

FIG. 5 is a graph of the normalized resistance of such a lightly doped implanted resistor as a function of temperature.

The foregoing discussion has assumed that the thin film resistors would have near zero TCR. The key element, however, is the difference in TCR between the high TCR resistors and the low TCR resistors. If the low TCR resistors have a TCR significantly greater than zero, the high TCR resistors should be designed to have a comparably greater TCR. Likewise, if the thin film resistors have a negative TCR the high TCR resistors should be designed to have a comparably lower TCR.

The embodiments of the invention in which an exclusive property or right is claimed are defined as follows:

1. A system for sensing pressure comprising:
    a pressure sensing means having output regions and including a piezoresistive device, said pressure sensing means being adapted to provide an output voltage at said output region indicative of stress on said piezoresistive device; and
    compensation means for compensating said output voltage for errors caused by changes in environmental temperature, said compensation means containing only passive electrical components, wherein said compensation means includes a plurality of electrical resistor means, said piezoresistive device and each of said electrical resistor means having associate therewith a temperature coefficient of resistivity, the temperature coefficients of resistivity of said electrical resistor means being selected so as to provide said compensation to said output voltage, and wherein the temperature coefficient of resistivity of at least one of said electrical resistor means is positive if the temperature coefficient of resistivity of said piezoresistive device is positive and is negative if the temperature coefficient of resistivity of said piezoresistive device is negative.

2. The appartus of claim 1 wherein:
    said pressure sensing means including first, second, third, and fourth piezoresistive means, each having first and second terminal means and each having a high temperature coefficient of resistivity, said first piezoresistive means second terminal means being electrically connected to said second piezoresistive means first terminal means, said second piezoresistive means second terminal means being electrically connected to said third piezoresistive means first terminal means, and said third piezoresistive means second terminal means being electrically connected to said fourth piezoresistive means first terminal means, said second piezoresistive means second terminal means and third piezoresistive means first terminal means being adapted to receive an input voltage of a first polarity, said first piezoresistive means second terminal means and said second piezoresistive means first terminal means being electrically connected to a first output terminal means, and said third piezoresistive means second terminal means and said fourth piezoresistive means first terminal means being electrically connected to a second output terminal means; and
    said compensation means includes first and second null balance means for maintaining a selected voltage between said first and second output terminal means over a range of temperatures when said piezoresistive means is subjected to no stress, each of said first and second null balance means having an input terminal means and an output terminal means and comprising a first low temperature coefficient of resistivity electrical resistance means in parallel electrical relationship with a high temperature coefficient of resistivity electrical resistance means, said first low temperature coefficient of resistivity electrical resistance means and said high temperature coefficient of resistivity means being togethe being in series electrical relationship with a second low temperature coefficient of resistivity electrical resistance means between said null balance input means and output means, said first and second null balance input terminal means being electrically connected to one another and being adapted to receive an input voltage of a second polarity, said first null balance means output terminal means being electrically connected to said first piezoelectric means first terminal means and said second null balance means output terminal means being electrically connected to said fourth piezoelectric means second terminal means.

3. The apparatus of claim 1 wherein:
    said pressure sensing means includes first, second, third, and fourth piezoresistive means, each having first and second terminal means and each having a high temperature coefficient of resistivity, said first piezoresistive means second terminal means being electrically connected to said second piezoresistive means first terminal means, said second piezoresistive means second terminal means being electrically connected to said third piezoresistive means first terminal means, and said third piezoresistive means second terminal means being electrically connected to said fourth piezoresistive means first terminal means, said second piezoresistive means second terminal means and third piezoresistive means first terminal means being adapted to receive an input voltage of a first polarity, said first piezoresistive means second terminal means and said second piezoresistive means first terminal means being electrically connected to a first output terminal means, and said third piezoresistive means second terminal means and said fourth piezoresistive means first terminal means being electrically connected to a second output terminal means; and
    said compensation means includes first and second span compensation means, each of said span compensation mean including a low temperature coefficient of resistivity electrical resistor means having first and second terminal means, said first and second span compensation means first terminal means being adapted to be electrically connected to first and second voltage sources, respectively, said first span compensation means second terminal means being electrically connected to said second piezoresistive means second terminal means and said third piezoresistive means first terminal means, and said second span compensation means second terminal means being electrically connected to said first piezoresistive means first terminal means and said fourth piezoresistive means first terminal means.

4. The apparatus of claim 1 wherein:
    said pressure sensing means includes piezoresistive means, each having first and second terminal means and each having a high temperature coefficient of resistivity said first piezoresistive means second terminal means being electrically connected to said second piezoresistive means first terminal means, said second piezoresistive means second terminal means being electrically connected to said third piezoresistive means first terminal means, and said third piezoresistive means second terminal means being electrically connected to said fourth piezoresistive means first terminal means, said second piezoresistive means second terminal means and third piezoresistive means first terminal means being adapted to receive an input voltage of a first polarity, said first piezoresistive means second terminal means and said second piezoresistive means first terminal means being electrically connected to a first output terminal means, and said third piezoresistive mean second terminal means and said fourth piezoresistive means first terminal means being electrically connected to a second output terminal means; and said compensation means includes maximum output compensation means including a high temperature coefficient of resistivity electrical resistor means having first and second terminal means, said maximum output compensation means first terminal means being electrically connected to said first output terminal means and said maximum output second terminal means being electrically connected to said second output terminal means.

5. A system for sensing pressure comprising:

a pressure sensing means comprising first, second, third, and fourth piezoresistive means, each having first and second terminal means and each having a high temperature coefficient of resistivity, said first piezoresistive means second terminal means being electrically connected to said second piezoresistive means first terminal means said second piezoresistive means second terminal means being electrically connected to said third piezoresistive means first terminal means, and said third piezoresistive means second terminal means being electrically connected to said fourth peezoresistive means first terminal means, said second piezoresistive means second terminal means and third piezoresistive means first terminal means being adapted to receive a input voltage of a first polarity, said first piezoresistive mean second terminal means and said second piezoresistive means first terminal means being electrically connected to a first output terminal means, and said third piezoresistive means second terminal means and said fourth piezoresistive means first terminal means being electrically connected to a second output terminal means; and first and second null balance means for maintaining a selected voltage between said first and second output terminal means over a range of temperatures when said piezoresistive means is subjected to no stress, each of said first and second null balance means having an input terminal means and an output terminal means and comprising a first low temperature coefficient of resistivity electrical resistance means in parallel electrical relationship with a high temperature coefficient of resistivity electrical resistance means, said first low temperature coefficient of resistivity electrical resistance means and said high temperature coefficient of resistivity means being together being in series electrical relationship with a second low temperature coefficient of resistivity electrical resistance means between said null balance input means and output means, said first and second null balance input terminal means being electrically connected to on another and being adapted to receive an input voltage of a second polarity, said first null balance means output terminal means being electrically connected to said first piezoelectric means first terminal means and said second null balance means output terminal means being electrically connected to said fourth piezoelectric means second terminal means.

6. The system of claim 5 wherein said first, second, third, and fourth piezoresistive means are formed by ion implantation of a dopant into a semiconductor material.

7. The system of claim 6 wherein said semiconductor material includes silicon.

8. The system of claim 6 wherein said high temperature coefficient of resistivity electrical resistor means of each of said first and second null balance means are formed by ion implantation of a dopant into a semiconductor material, said first, second, third, and fourth piezoresistive means and said high temperature coefficient of resistivity electrical resistance means all having substantially equa dopant concentrations in said semiconductor material.

9. The system of claim 6 wherein said first and second low temperature coefficient of resistivity electrical resistance means of each of said first and second null balance means are capable of being laser trimmed.

10. The system of claim 9 wherein said high temperature coefficient of resistivity electrical resistor means of each of said first and second null balance means are formed by ion implantation of a dopant into a semiconductor material, said first, second, third, and fourth piezoresistive means and said high temperature coefficient of resistivity electrical resistance means all having substantially equal dopant concentrations in said semiconductor material.

11. The system of claim 6 further comprising first and second span compensation means, each of said span compensation means including a low temperature coefficient of resistivity electrical resistor means having first and second terminal means said first and second span compensation means first terminal means being adapted to be electrically connected to first and second voltage sources, respectively, said first span compensation means second terminal means being electrically connected to said second piezoresistive means second terminal means and said third piezoresistive means first terminal means, and said second span compensation means second terminal means being electrically connected to said first and second null balance input means.

12. The system of claim 6 further comprising maximum output compensation means including a high temperature coefficient of resistivity electrical resistor means having first and second terminal means, said maximum output compensation means first terminal means being electrically connected to said first output terminal means and said maximum output second terminal means being electrically connected to said second output terminal means.

13. The system of claim 12 wherein said maximum output compensation means electrical resistor means is formed by ion implantation of a dopant into a semiconductor material, said maximum output compensation means electrical resistor means and said first, second, third, and fourth piezoresistive means all having substantially equal dopant concentration in said semiconductor material.

14. The system of claim 12 further comprising first and second span compensation means, each of said span compensation means including a low temperature coefficient of resistivity electrical resistor means having first and second terminal means, said first and second span compensation means first terminal means being adapted to be electrically connected to first and second voltage sources, respectively, said first span compensation means second terminal means being electrically connected to said second piezoreistive means second terminal means and said third piezoresistive means first terminal means, and said second span compensation means second terminal means being electrically connected to said first and second null balance input means.

15. The system of claim 14 wherein said maximum output compensation means, electrical resistor means and said high temperature coefficient of resistivity means of each of said first and second null balance means are formed by ion implantation of a dopant into a semiconductor material, said maximum output compensation means, electrical resistor means, said high temperature coefficient of resistivity means of each of said first and second null balance means, and said first, second, third, and fourth piezoresistive means all having substantially equal dopant concentration in said semiconductor material.

16. A system for sensing pressure comprising:
a pressure sensing means comprising first, second, third, and fourth piezoresistive means, each having first and second terminal means and each having a high temperature coefficient of resistivity, said first piezoresistive means second terminal means being electrically connected to said second piezoresistive means first terminal means, said second piezoresistive means second terminal means being electrically connected to said third piezoresistive means first terminal means, and said third piezoresistive means second terminal means being electrically connected to said fourth piezoresistive means first terminal means, said second piezoresistive means second terminal means and third piezoresistive means first terminal means being adapted to receive an input voltage of a first polarity, said first piezoresistive means second terminal means and said second piezoresistive means first terminal means being electrically connected to a first output terminal means, and said third piezoresistive means second terminal means and said fourth piezoresistive means first terminal means being electrically connected to a second output terminal means; and
first and second span compensation means, each of said span compensation means including a low temperature coefficient of resistivity electrical resistor means having first and second terminal means, said first and second span compensation means first terminal means being adapted to be electrically connected to first and second voltage sources, respectively, said first span compensation means second terminal means being e ectrically connected to said second piezoresistive means second terminal means and said third piezoresistive means first terminal means, and said second span compensation means second terminal means being electrically connected to said first piezoresistive means first terminal means and said fourth piezoresistive means first terminal means.

17. The system of claim 16 further comprising maximum output compensation means including a high temperature coefficient of resistivity electrical resistor means having first and second terminal means, said maximum output compensation means first terminal means being electrically connected to said first output terminal means and said maximum output second terminal means being electrically connected to said second output terminal means.

18. The system of claim 17 wherein said first, second, third, and fourth piezoresistive means are formed by ion implantation of a dopant into a semiconductor material.

19. The system of claim 18 wherein said maximum output compensation means electrical resistor means is formed by ion implantation of a dopant into a semiconductor material, said maximum output compensation means electrical resistor means and said first, second, third, and fourth piezoresistive means all having substantially equal dopant concentration in said semiconductor material.

20. A system for sensing pressure comprising:
a pressure sensing means comprising first, second, third, and fourth piezoresistive means, each having first and second terminal means and each having a high temperature coefficient of resistivity said first piezoresistive means second terminal means being electrically connected to said second piezoresistive means first terminal means, said second piezoresistive means second terminal means being electrically connected to said third piezoresistive means first terminal means, and said third piezoresistive means second terminal means being electrically connected to said fourth piezoresistive means first terminal means, said second piezoresistive means second terminal means and third piezoresistive means first terminal means being adapted to receive an input voltage of a first polarity, said first piezoresistive means second terminal means and said second piezoresistive means first terminal means being electrically connected to a first output terminal means, and said third piezoresistive means second terminal means and said fourth piezoresistive means first terminal means being electrically connected to a second output terminal means; and
maximum output compensation means including a high temperature coefficient of resistivity electrical resistor means having first and second terminal means, said maximum output compensation means first terminal means being electrically connected to said first output terminal means and said maximum output second terminal means being electrically connected to said second output terminal means.

21. The system of claim 20 wherein said first, second, third, and fourth piezoresistive means are formed by ion implantation of a dopant into a semiconductor material.

22. The system of claim 21 wherein said maximum output compensation means electrical resistor means is formed by ion implantation of a dopant into a semiconductor material, said maximum output compensation means electrical resistor means and said first, second, third, and fourth piezoresistive means all having substantially equal dopant concentration in said semiconductor material.

* * * * *

UNITED STATES PATENT AND TRADEMARK OFFICE
CERTIFICATE OF CORRECTION

PATENT NO. : 4,788,521
DATED : November 29, 1988
INVENTOR(S) : Russell L. Johnson It is certified that error appears in the above-identified patent and that said Letters Patent is hereby corrected as shown below:

Column 6, line 36, cancel "mean" and substitute --means--.

Column 7, line 3, cancel "mean" and substitute --means--;

line 23, cancel "terminal means" and substitute

--terminal means,--;

line 33, cancel "mean" and substitute --means--;

line 43, cancel "no," and substitute --no--;

line 58, cancel "on" and substitute --one--.

Column 8, line 10, cancel "equa" and substitute --equal--;

line 29, cancel "means" and substitute --means,--.

Column 9, line 47, cancel "e ectrically" and substitute - electrically --.

Signed and Sealed this

Sixth Day of June, 1989

Attest:

DONALD J. QUIGG

Attesting Officer

Commissioner of Patents and Trademarks